US012654467B2

(12) United States Patent
Haller et al.

(10) Patent No.: US 12,654,467 B2
(45) Date of Patent: Jun. 16, 2026

(54) SYSTEM, METHOD AND COMPUTER PROGRAM PRODUCT FOR SIDE PRINTING ON SOLID SURFACES

(71) Applicant: Wall to Wall, LLC, Hayward, CA (US)

(72) Inventors: Amit Haller, Belmont, CA (US); Israel Jay Klein, Kfar Saba (IL)

(73) Assignee: Wall to Wall, LLC, Hayward, CA (US)

( * ) Notice: Subject to any disclaimer, the term of this patent is extended or adjusted under 35 U.S.C. 154(b) by 271 days.

(21) Appl. No.: 18/000,185

(22) PCT Filed: May 31, 2021

(86) PCT No.: PCT/IL2021/050646
§ 371 (c)(1),
(2) Date: Nov. 29, 2022

(87) PCT Pub. No.: WO2021/245659
PCT Pub. Date: Dec. 9, 2021

(65) Prior Publication Data

US 2023/0202200 A1 Jun. 29, 2023

Related U.S. Application Data

(60) Provisional application No. 63/032,952, filed on Jun. 1, 2020.

(51) Int. Cl.
*B41J 3/407* (2006.01)
*B05D 1/26* (2006.01)
*B41M 5/00* (2006.01)

(52) U.S. Cl.
CPC .............. *B41J 3/4073* (2013.01); *B05D 1/26* (2013.01); *B41M 5/0088* (2013.01); *B05D 2252/00* (2013.01)

(58) Field of Classification Search
CPC ...... B33Y 10/00; B33Y 30/00; H10K 71/135; B41J 3/407; B41J 3/4073; B41J 3/40733;
(Continued)

(56) References Cited

U.S. PATENT DOCUMENTS

| | | | | |
|---|---|---|---|---|
| 6,360,656 | B2 | 3/2002 | Kubo et al. | |
| 7,001,016 | B2 | 2/2006 | Baxter et al. | |
| 2001/0017085 | A1 * | 8/2001 | Kubo | B41J 3/4073 101/35 |

FOREIGN PATENT DOCUMENTS

| | | | |
|---|---|---|---|
| JP | 2009012430 | A | 1/2009 |
| JP | 2014105536 | A | 6/2014 |

(Continued)

OTHER PUBLICATIONS

International Search Report and Written Opinion mailed Sep. 9, 2021, directed to International Application No. PCT/IL2021/050646; 11 pages.

*Primary Examiner* — Jannelle M Lebron
(74) *Attorney, Agent, or Firm* — Morrison & Foerster LLP

(57) ABSTRACT

A system for manufacturing structural members with coated main and side surfaces, the system comprising at least one structural member having at least one main surface; at least one side surface which is obliquely oriented relative to the main surface; and a coating apparatus operative, in a single pass over the structural member, to deposit at least one coating on said at least one structural member including said at least one main surface and said at least one side surface.

15 Claims, 18 Drawing Sheets

(58) Field of Classification Search
CPC ..... B41M 5/0088; B41M 5/0082; B05D 1/26; B05D 1/00
See application file for complete search history.

(56) References Cited

FOREIGN PATENT DOCUMENTS

| | | | |
|---|---|---|---|
| WO | 2013011851 | A1 | 1/2013 |
| WO | 2014163196 | A1 | 10/2014 |

* cited by examiner $$y = a \qquad y' = 0$$

$$(L')^2 = (y')^2 + 1 = 0 + 1 = 1$$

$$L' = 1$$

$$L = x$$

$$y = 1 - ax \qquad y' = -a$$

$$(L')^2 = (y')^2 + 1 = a^2 + 1$$

$$L' = \sqrt{a^2 + 1}$$

$$L = x\sqrt{a^2 + 1}$$

SYSTEM, METHOD AND COMPUTER PROGRAM PRODUCT FOR SIDE PRINTING ON SOLID SURFACES

REFERENCE TO CO-PENDING APPLICATIONS

Priority is claimed from U.S. provisional application No. 63/032,952, entitled "Side printing on solid surfaces" and filed 1 Jun. 2020, the disclosure of which application/s is hereby incorporated by reference.

FIELD OF THIS DISCLOSURE

The present invention relates generally to printing, and more particularly to printing on 3D objects.

BACKGROUND FOR THIS DISCLOSURE

Solid surfaces or substrates are used in the industry for various applications, such as countertops and walls, both indoors and outdoors. The solid substrate may be a layer from among several layers which, together, make up a wall or other substrate.

HP Latex R2000 plus is an example of a printer which prints on large solid (rigid and/or flexible) surfaces which may have at least one dimension which is 1 or 2 or 3 or more meters long.

Sometimes, the side surfaces of substrates used, say, as walls (or wall layers) or countertops, are visible.

However, conventionally, the main surface of the substrate to be printed on is presented to the printer on its main area, while its sides remain perpendicular to the printer head, hence are not exposed to the printing process.

Often, multicolored patterns, rather than a single solid color, are applied by the printing process.

Sublimation printing is known and typically transfers a design into a substrate e.g. fabric using ink and heat. The inks that are used turn into gas when heated and thus react with the substrate and become embedded therewithin permanently, as opposed to being a separate layer or coating on top of the substrate. The heat typically opens the pores of the substrate, and then, with applied pressure, the ink cools and solidifies. However, sublimation requires substances e.g. coatings which are designed to receive sublimation inks. Also, sublimation involves an intermediate step which introduces complexities which increase manufacturing time and/or yield an end result which may be of lower quality than a direct printout process.

The disclosures of all publications and patent documents mentioned in the specification, and of the publications and patent documents cited therein directly or indirectly, are hereby incorporated by reference, other than subject matter disclaimers or disavowals. If the incorporated material is inconsistent with the express disclosure herein, the interpretation is that the express disclosure herein describes certain embodiments, whereas the incorporated material describes other embodiments. Definition/s within the incorporated material may be regarded as one possible definition for the term/s in question.

SUMMARY OF CERTAIN EMBODIMENTS

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented, as appropriate.

Certain embodiments of the present invention include printing a pattern, which may even include a hologram, on the sides of solid surfaces or structural members or substrates, typically in addition to printing on the main surface, without the need for printing first on some intermediary transitional layer (e.g., sheet). Eliminating this process, which typically involves sublimation (i.e., transferring the printout from the interfacing layer to the solid surface itself), simplifies the printing method and reduces the end-to-end printing time.

Certain embodiments of the present invention seek to provide a method for providing patterned walls, which may have curved or tilted side surfaces rather than side surfaces which are perpendicular to the walls' or wall layers' main surface, wherein the pattern is printed onto the wall or a visible layer thereof, typically prior to assembling the printed wall layer and other wall layers into a wall which is then deployed at a site, rather than first assembling the wall and then painting or otherwise applying a pattern to the assembled wall, on-site.

It is common to enrich the "look and feel" of a substrate e.g. wall (or wall layer) or countertop by applying coloring and/or printed patterns on top. Dedicated printers for such applications exist and they can cover large printing areas, matching the application's needs. A common problem is when it is sought to apply a pattern not only to the main surface, but also to the side surfaces. Printers which can directly print on the surface typically require a horizontal feed while the printing action takes place. Conventionally, the main surface of the substrate to be printed on is presented to the printer on its main area while its sides remain perpendicular to the printer head, hence are not exposed to the printing process.

In order to overcome this limitation the industry has resorted to sublimation printing. This method requires an intermediate step which, in effect, removes the direct printout on the surface itself (at least for the sides). The intermediate step may call for printing the required patterns on a transitional layer. After this step is complete the layer is attached and applied to the surface and its sides, and the printout is transferred from the layer to the surface itself. This intermediate step introduces some complexities into the process and increases the manufacturing time, and the end result may be of lower quality than a direct printout process.

Printing technologies applicable for solid surfaces exist. However, embodiments herein are useful e.g. for construction companies, contractors, architects, etc., in eliminating any need for sublimation, and facilitating, instead, printout which is direct and/or simple and/or convenient and/or in a single operation, on both the substrate's main surface and its side surfaces.

Other alternatives are to avoid printing on the sides of the surfaces which may greatly detract aesthetically or functionally, if the coating being printed has functionality rather than or in addition to aesthetic value. In other cases, if the need to printout on the sides of a substrate cannot be overcome, an intermediate step in the printing process may be required which may complicate the end-to-end process and require additional time which can be crucially detrimental to the efficiency of mass production of the substrate to be printed.

It is appreciated that any reference herein to, or recitation of, an operation being performed, e.g. if the operation is performed at least partly in software, is intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operations, and, instead, the remote processor P itself may receive output/s of portion/s of the operation from yet another processor/s P', may be deployed off-shore relative to P, or "on a cloud", and so forth.

The present invention thus typically includes at least the following embodiments:

- Embodiment 1. A system for manufacturing structural members with coated main and side surfaces, the system comprising:
  - at least one structural member typically having at least one main surface; and/or
    - at least one side surface which is typically obliquely oriented relative to the main surface; and/or
  - a coating apparatus operative, typically in a single pass over the structural member, to deposit at least one coating on the at least one structural member typically including the at least one main surface and/or the at least one side surface.
- Embodiment 2. A system according to any of the preceding embodiments wherein the coating apparatus comprises an array of printing heads and wherein the coating is printed onto the structural member.
- Embodiment 3. A system according to any of the preceding embodiments wherein the structural member is apertured thereby to define aperture side surfaces and wherein the at least one side surface which is obliquely oriented relative to the main surface includes at least one of the aperture side surfaces.
- Embodiment 4. A system according to any of the preceding embodiments wherein the at least one side surface which is obliquely oriented is a straight surface whose angle relative to the main surface differs from 90 degrees.
- Embodiment 5. A system according to any of the preceding embodiments wherein the side surface's oblique orientation relative to the main surface defines an angle, between the main surface and the side surface, of over 90 degrees, and wherein, when the coating apparatus coats the at least one structural member, the coating apparatus deposits the coating on the main surface and on the at least one side surface.
- Embodiment 6. A system according to any of the preceding embodiments wherein the structural member is rigid and wherein the main surface is planar.
- Embodiment 7. A system according to any of the preceding embodiments wherein the coating comprises a layer of ink.
- Embodiment 8. A system according to any of the preceding embodiments wherein the coating comprises a pattern including at least one first portion of the pattern to be printed on at least a portion of at least one main surface and at least one second portion of the pattern to be printed on at least one side surface.
- Embodiment 9. A system according to any of the preceding embodiments wherein a cross-section of the structural member has a side surface which is curved thereby to define a curve aka side curve extending between the structural member's top and bottom main surfaces, and wherein the curve has a length which differs from a width of the structural member which equals a distance between the structural member's top and bottom main surfaces, and wherein the second portion of the pattern is modified computationally, by a hardware processor, to cover the length rather than over the width, thereby to define a modified second portion of the pattern, and wherein the modified second portion of the pattern is applied to the at least one side surface.

Typically a pattern includes a grid of pixels which may be stored electronically. Modifying the grid typically comprises generating a new grid.

An advantage is that the above modifying or distortion while printing, yields a printed surface which appears undistorted in the area of the side surface—despite the fact that the side surface is oriented differently than the main surface. Example: if a side surface forms a 45 degree angle with the main surfaces of a substrate, then the distance between the two main surfaces along the side surface is the square root of 2, times the distance between the main surfaces, as the crow flies. If it is desired to provide parallel lines, M mm apart, parallel to the edge connecting main and side surfaces, then printing of lines may occur 0.5×(2 exp 0.5)×M mm apart, or approximately 0.7M millimeters apart.

- Embodiment 10. A system according to any of the preceding embodiments wherein the second portion of the pattern is printed on a surface including the at least one side surface and a portion of the main surface adjacent to the side surface, and wherein the first portion of the pattern is printed on a portion of the at least one main surface, that does not include the portion of the main surface adjacent to the side surface on which the second portion is printed.
- Embodiment 11. A method for manufacturing structural members with coated main and side surfaces, the method comprising:
  - providing at least one structural member having at least one main surface and at least one side surface which is obliquely oriented relative to the main surface; and
  - providing coating apparatus operative, in a single pass over the structural member, to deposit at least one coating on the at least one structural member including the at least one main surface and the at least one side surface.
- Embodiment 12. A method according to any of the preceding embodiments wherein the coating comprises a pattern including at least one first portion of the pattern to be printed on at least a portion of at least one main surface and at least one second portion of the pattern to be printed on at least one side surface.
- Embodiment 13. A method according to any of the preceding embodiments wherein a cross-section of the structural member has a side surface which is curved, thereby to define a curve aka side curve extending between the structural member's top and bottom main surfaces, and wherein the curve has a length which differs from a width of the structural member which equals a distance between the structural member's top and bottom main surfaces, and wherein the second portion of the pattern is modified computationally, by a hardware processor, to cover the length rather than over the width, thereby to define a modified second portion of the pattern, and wherein the modified second portion of the pattern is applied to the at least one side surface.
- Embodiment 14. A computer program product, comprising a non-transitory tangible computer readable medium having computer readable program code embodied therein, the computer readable program code adapted to be executed to implement a method for manufacturing structural members with coated main and side surfaces, the method comprising:

providing at least one structural member having at least one main surface and at least one side surface which is obliquely oriented relative to the main surface; and providing coating apparatus operative, in a single pass over the structural member, to deposit at least one coating on the at least one structural member, including the at least one main surface and the at least one side surface.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes, or a general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with all or any subset of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as flash drives, optical disks, CDROMs, DVDs, BluRays, magnetic-optical discs or other discs; RAMs, ROMs, EPROMs, EEPROMs, magnetic or optical or other cards, for storing, and a keyboard or mouse for accepting. Modules illustrated and described herein may include any one or combination or plurality of: a server, a data processor, a memory/computer storage, a communication interface (wireless (e.g. BLE) or wired (e.g. USB)), a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network, or a computer network such as the Internet.

The apparatus of the present invention may include, according to certain embodiments of the invention, machine readable memory containing or otherwise storing a program of instructions which, when executed by the machine, implements all or any subset of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program, such as but not limited to a general purpose computer, which may, optionally, be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another. Any controller or processor may for example comprise at least one CPU, DSP, FPGA or ASIC, suitably configured in accordance with the logic and functionalities described herein.

Any feature or logic or functionality described herein may be implemented by processor/s or controller/s configured as per the described feature or logic or functionality, even if the processor/s or controller/s are not specifically illustrated for simplicity. The controller or processor may be implemented in hardware, e.g., using one or more Application-Specific Integrated Circuits (ASICs) or Field-Programmable Gate Arrays (FPGAs) or may comprise a microprocessor that runs suitable software, or a combination of hardware and software elements.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate or route, or otherwise manipulate or process information as described herein and/or to perform functionalities described herein and/or to implement any engine, interface or other system illustrated or described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

The system shown and described herein may include user interface/s e.g. as described herein, which may, for example, include all or any subset of: an interactive voice response interface, automated response tool, speech-to-text transcription system, automated digital or electronic interface having interactive visual components, web portal, visual interface loaded as web page/s or screen/s from server/s via communication network/s to a web browser or other application downloaded onto a user's device, automated speech-to-text conversion tool, including a front-end interface portion thereof and back-end logic interacting therewith. Thus the term user interface or "UI" as used herein includes also the underlying logic which controls the data presented to the user e.g. by the system display. and receives and processes and/or provides to other modules herein, data entered by a user e.g. using her or his workstation/device.

BRIEF DESCRIPTION OF THE DRAWINGS

Example embodiments are illustrated in the various drawings of which FIGS. 9-5, 11*a*-11*b*, 13-14 are simplified pictorial illustrations, FIGS. 6-10*b* are graphs.

FIG. 5 is similar to FIG. 4, but in this case the surface was manufactured with tilted sides and therefore they are exposed to the printing action.

FIG. 6 illustrates a distortion function (or curve length) derivation. Assuming that the function of the tilt or curvature is known, then the length of the curve may be computed e.g. using the illustrated computation.

FIG. 7 illustrates a distortion function (or curve length) derivation in the case of no tilt or curvature. The length of the curve matches the horizontal advancement hence no distortion.

FIG. 8 illustrates a distortion function (or curve length) derivation in the case of a straight tilt. The length of the curve follows the horizontal advancement at some scale depending on the tilt angle.

FIG. 10*b* illustrates a demonstration of actual length vs. actual horizontal displacement (width).

FIG. 11*a* illustrates an example calibration test surface for adjusting for printer inaccuracies while printing on tilted areas. The "calibration test surface" may comprise a substrate with various different tilts, as shown in the drawing in cross-section.

FIG. 11*b* illustrates a method for calibration testing by using a pre-defined pattern to be printed on the target surface with actual tilt/curvature as planned.

FIG. 12*a* illustrates a method for computing distortion adjustments typically comprising pre-computed variables in the sense that the curvature function of the wall (or wall layer) aka wall profile, $y=f(x)$, may be known in advance in which case $l(x)$ may be computed e.g. using the formula in FIG. 6.

FIG. 12*b* illustrates a method for applying the distortion adjustments e.g. as computed by the method of FIG. 12*a*, typically per row of pixels. According to certain embodiments, the rows are parallel to the border between the main surface and side surface. According to certain embodiments, the printer prints in parallel to a leveled surface, or assumes the surface is leveled, even if the substrate is, in fact, tilted or curved, rather than levelled.

FIGS. 13, 14 are diagrams useful in understanding certain embodiments.

Figure 1:
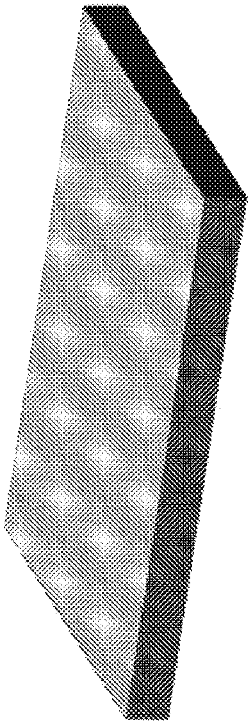
FIG. 1 illustrates a typical surface with perpendicular side surfaces.

Certain embodiments of the present invention are illustrated in the above drawings; in the block diagrams, arrows between modules may be implemented as APIs and any suitable technology may be used for interconnecting functional components or modules illustrated herein in a suitable sequence or order e.g. via a suitable API/Interface. For example, state of the art tools may be employed, such as but not limited to Apache Thrift and Avro which provide remote call support. Or, a standard communication protocol may be employed, such as but not limited to HTTP or MQTT, and may be combined with a standard data format, such as but not limited to JSON or XML.

Methods and systems included in the scope of the present invention may include any subset or all of the functional blocks shown in the specifically illustrated implementations by way of example, in any suitable order e.g. as shown. Flows may include all or any subset of the illustrated operations, suitably ordered e.g. as shown. Tables herein may include all or any subset of the fields and/or records and/or cells and/or rows and/or columns described.

Computational, functional or logical components described and illustrated herein can be implemented in various forms, for example, as hardware circuits, such as but not limited to custom VLSI circuits or gate arrays or programmable hardware devices, such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs, and may originate from several computer files which typically operate synergistically.

Each functionality or method herein may be implemented in software (e.g. for execution on suitable processing hardware such as a microprocessor or digital signal processor), firmware, hardware (using any conventional hardware technology such as Integrated Circuit Technology) or any combination thereof.

Functionality or operations stipulated as being software-implemented may alternatively be wholly or fully implemented by an equivalent hardware or firmware module, and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware, in which case all or any subset of the variables, parameters, and computations described herein may be in hardware.

Any module or functionality described herein may comprise a suitably configured hardware component or circuitry. Alternatively or in addition, modules or functionality described herein may be performed by a general purpose computer, or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application, if, and as appropriate, and which may employ any suitable architectural option, such as but not limited to FPGA, ASIC or DSP, or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing all or any subset of the method's operations, including a mobile application, platform or operating system e.g. as stored in a medium, as well as combining the computer program with a hardware device to perform all or any subset of the operations of the method.

Data can be stored on one or more tangible or intangible computer readable media stored at one or more different locations, different network nodes, or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies, such as semiconductor, magnetic, optical, paper and others.

DETAILED DESCRIPTION OF CERTAIN EMBODIMENTS

Certain embodiments include surface preparation and/or analytical adjustments of patterns to be printed e.g. to accommodate for surface geometry (especially its edges, as will be discussed).

As presented in FIG. 1, a typical solid surface is a rectangular prism, meaning that all sides are perpendicular to the main surface area.

Figure 2:
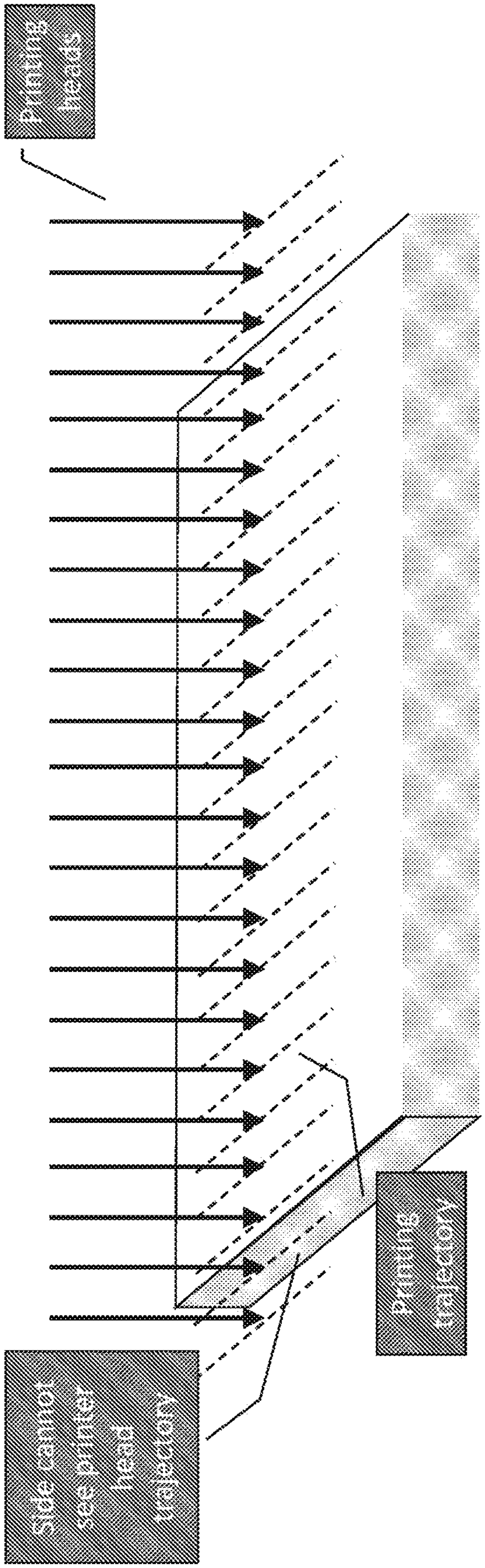
FIG. 2 illustrates a printer head (or heads) printing direction over a surface. As shown, the perpendicular sides are not exposed to the printing operation.

As demonstrated in FIG. 2, when a printer is aimed for printing over the surface, it advances over the main surface area and the printing heads' major axes are typically perpendicular or angled relative to the main area and to the advancement direction.

Figure 3:
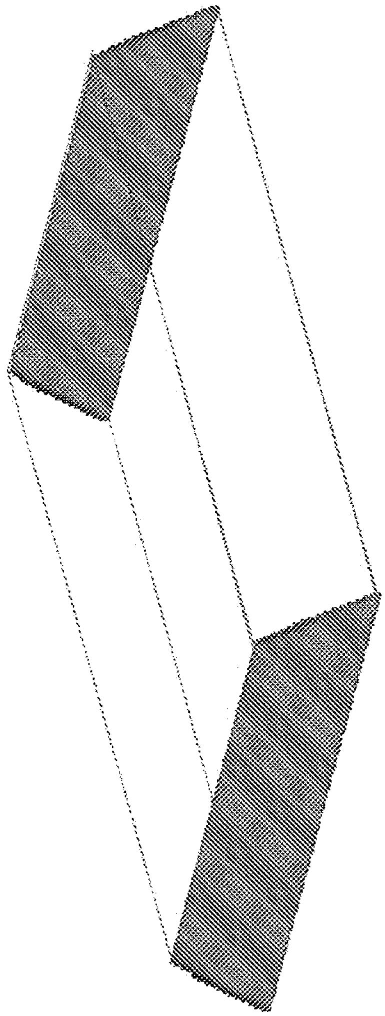
FIG. 3 illustrates a surface which has been manufactured with tilted sides.

According to certain embodiments, tilt or curvature of the edges or side surfaces of the substrate to be printed, are provided e.g. as illustrated in FIG. 3. This allows the side surfaces and main surface/s to be printed on, in a single pass over the substrate. In this pass, either the substrate moves once past (and typically below) the printer, or the printer moves once past (and typically above) the substrate. If the tilt is deemed aesthetically or functionally undesirable, the tilt can be small e.g. the angle of the side surface to the main surface may be close to perpendicular (e.g. 70 or 75 or 80 or 85 degrees, or any other value, rather than 90 degrees), to minimize any detrimental effect on aesthetics or functionality.

Figure 4:
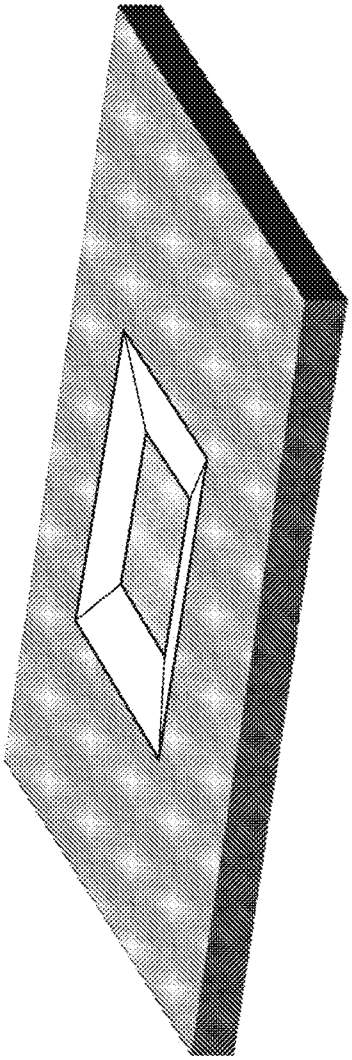
FIG. 4 illustrates a surface which has an aperture (e.g., window opening). The aperture itself has been manufactured with tilted sides.

Typically the term "sides" is not limited to the specific geometry of a rectangular prism. In FIG. 4, a surface is manufactured with an aperture which, for example, can represent a window opening. Similarly, the sides or edges of the aperture can be manufactured with some tilt or curvature.

Figure 5:
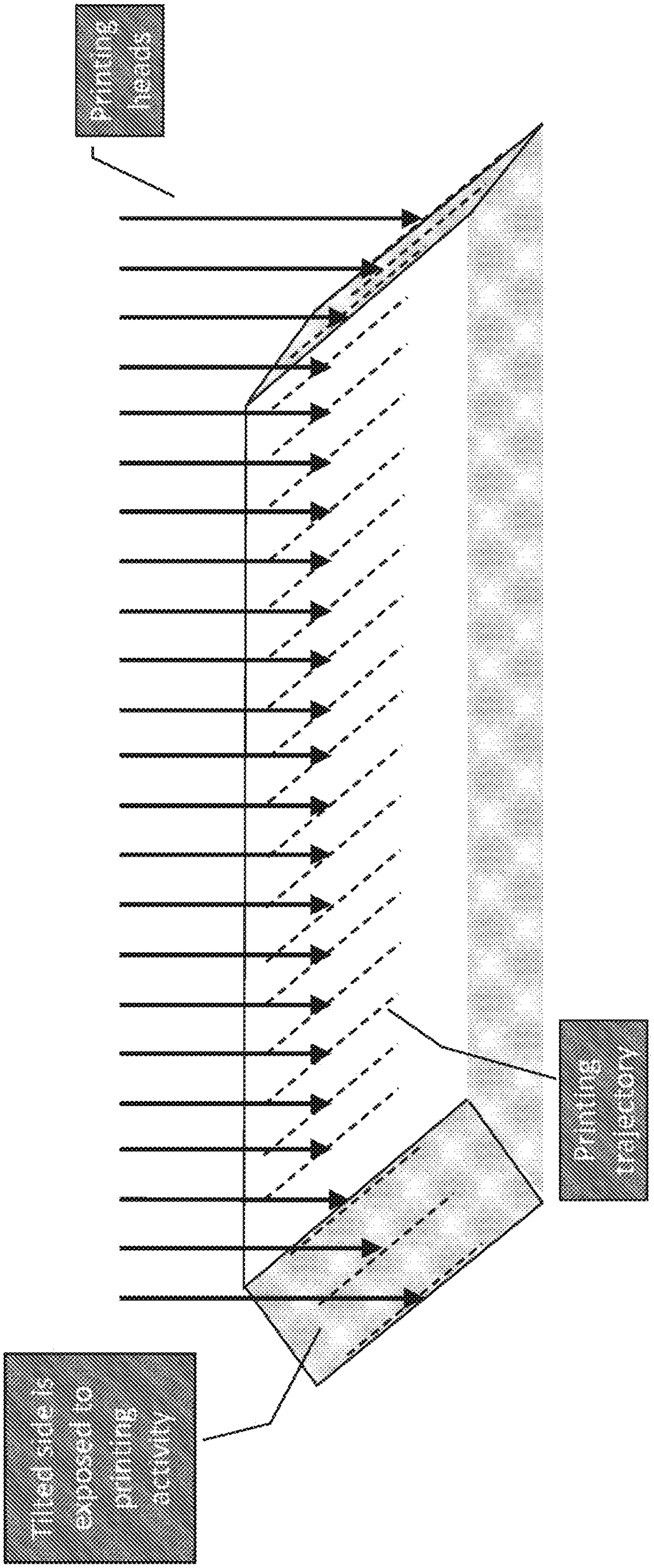

In FIG. 5, again the printer placement and trajectories are presented. In this case, due to the tilt of the sides, they are exposed to the printing head activity, and hence the printer will "print" on them.

Typically, manufacturing the surface sides with some tilt or curvature is followed by computation to compensate for the aesthetics of printing over a tilted or curved, rather than flat, surface. An optical distortion will be apparently noticeable, and, in addition, it may be desired to compensate for the increased distance of the printing head from the tilted surface and the changes of it. Compensation is typically due to aesthetics. For example, if the printed picture were to change abruptly at the edge, this would create a negative aesthetic impression to a viewer. According to some embodiments, the pattern is smoothed computationally to smooth the transition from printing on a leveled surface to printing on the edge. To do this, the system may start to change the pattern not at the border line between the main "leveled" surface and the "edge" or side surface, but, instead, some distance before the border line. An example distortion function may be derived based on the side view (profile) of the tilted or curved side.

According to certain embodiments, the derivation in this file (FIG. 6) is aimed for a single dimension (row or column) compensation due to simplicity, yet it is appreciated that a 2D derivation can be applied in a similar manner.

According to certain embodiments, the implementation assumes that all cross-sections (respectively corresponding to rows of the pattern to be printed) of the tilted or curved side surface are identical, such that the single-dimension compensation described herein, if repeated for all pattern rows, is suitable. If, however, the side surface's geometry varies in both directions such that its various cross-sections differ between them, the single-dimension compensation method described herein may be adapted to the two-dimensional case.

Figure 6:
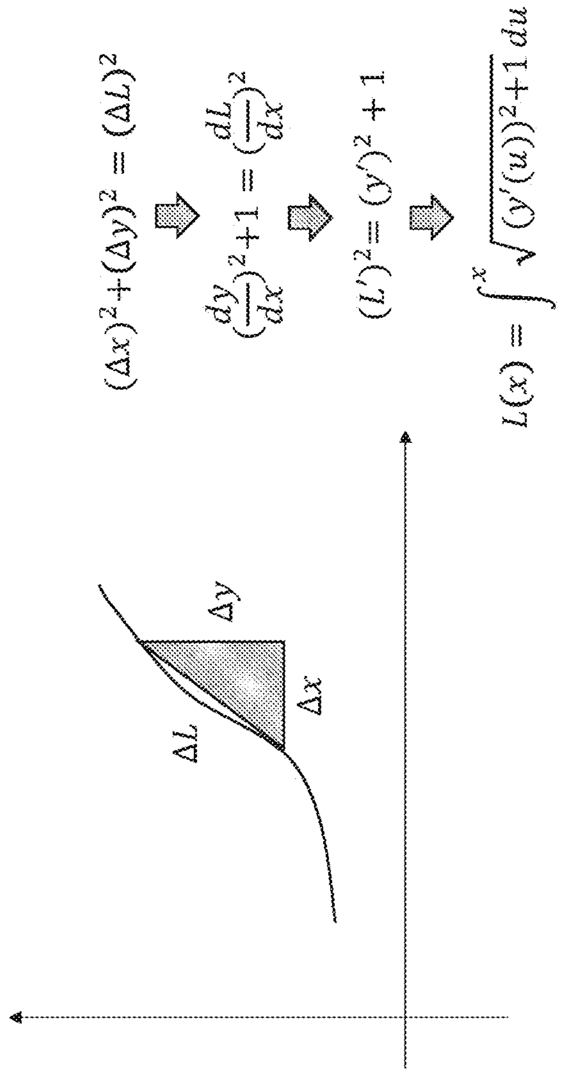

The graph of the curvature function is presented (FIG. 6). The curvature may be that of a cross section of an end-portion of a substrate to be printed upon and the axes of the graph of FIG. 6 may be the conventional x and y axes of Euclidean space. If an infinitesimal step on the curve is examined, the Pythagorean law may be used to derive a formula for the curve length as a function of the cross-section advancement. In other words, and by example—if the printout pattern were parallel equally spaced lines (see FIG. 5) then the distance between these lines may change when printed over a tilted or curved area. If the length of the curve (as a function of displacement from the tilt edge start) is known, then maintaining the previous spacing can be done by computing the curve length and compensating accordingly. Some examples are given.

Figure 7:
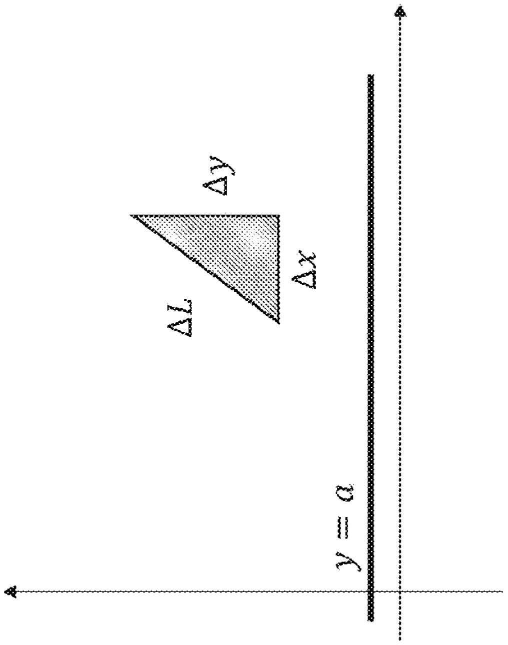

FIG. 7 relates to a use-case where there is no tilted edge (e.g. because the side surface is perpendicular to the main surfaces). In this case, the "tilt" length function typically calls for no compensation as there is no tilt $L(x)=x$.

Figure 8:
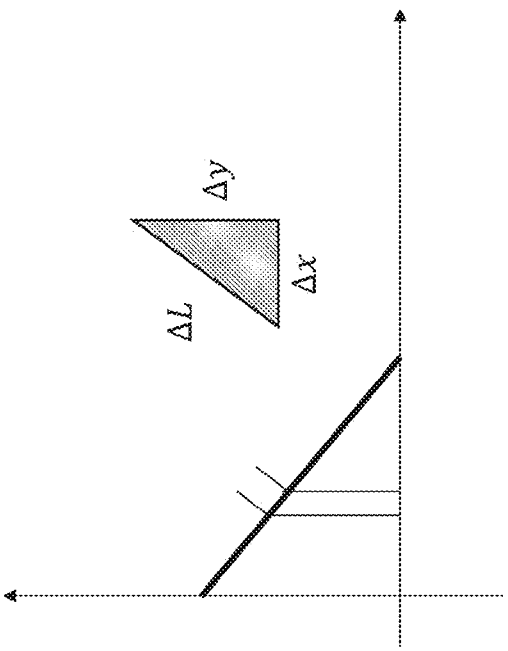

FIG. 8 relates to a use-case where the side surface comprises a straight slope tilt (e.g., $y=ax+b$ where b may be positive, zero or negative). Typically, the tilt length function follows (by some factor depending on the slope value) the linear displacement, hence has a relatively simple scaling effect. In the case of a 45 degree slope for example, equal spacing D (e.g. between lines of a pattern) over an area (e.g. of the main surface) with no tilt, is translated or modified into equal spacing of 1.4D (approximately) over the tilt (e.g. for the side surface).

Figure 9A:
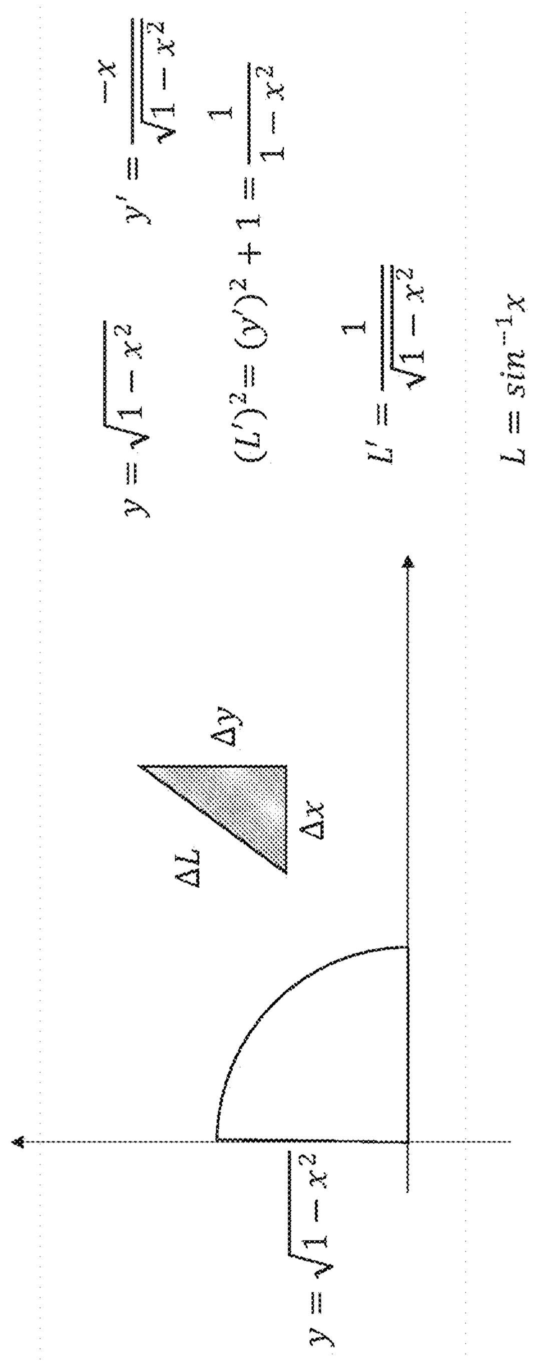
FIG. 9*a* illustrates a distortion function (or curve length) derivation in the case of quarter circle curve. The length of the curve follows an arc sin trigonometric function of the horizontal advancement.

FIG. 9*a* relates to a use-case where the side surface is curved and its curvature is shaped like a quarter of a circle. Typically the length of the curve follows an arc sin trigonometric function since the displacement x is translated into an angle covering some arc length.

Figure 9B:
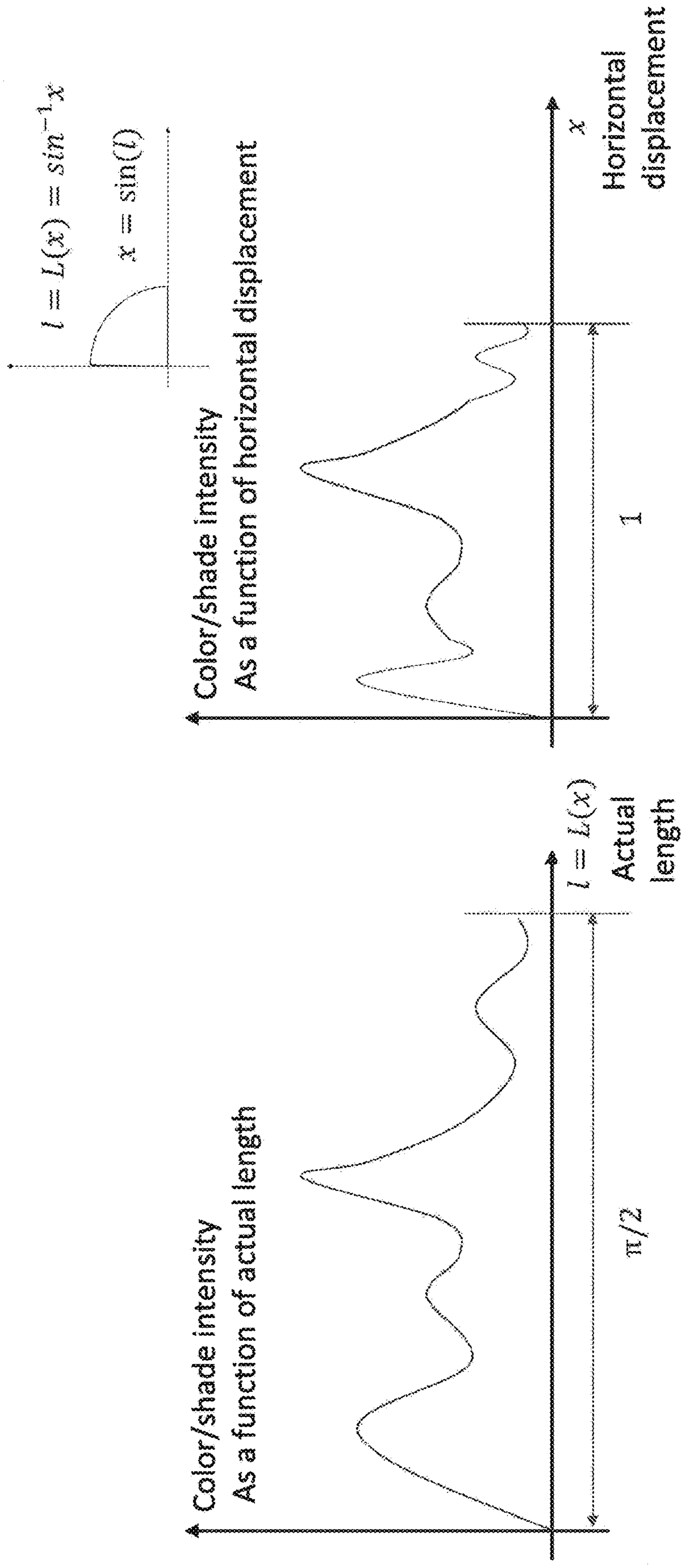
FIG. 9*b* illustrates an example of a single row color (or shade) component intensity on actual length translated to actual horizontal displacement using the inverse function of the example derived in FIG. 9*a*.

The embodiment of FIG. 9*b* uses an inverse function of the length to be used for adjusting for tilt distortion. In the example of FIG. 9*a*, the horizontal displacement through the row can be derived from $l=L(x)$ by inverting the function, and in the case of FIG. 9*a* the inverted function is similarly $x=\sin(l)$. If for example one of the color (or shade) components of the printed row of pixels (e.g. c or y or m or k, if cmyk coordinates are used) are taken, then the graph may be distorted when plotting the graph for x, instead of for l. This may be the actual data that may be fed into the printer, in order to accommodate for the tilt distortion.

Figure 10A:
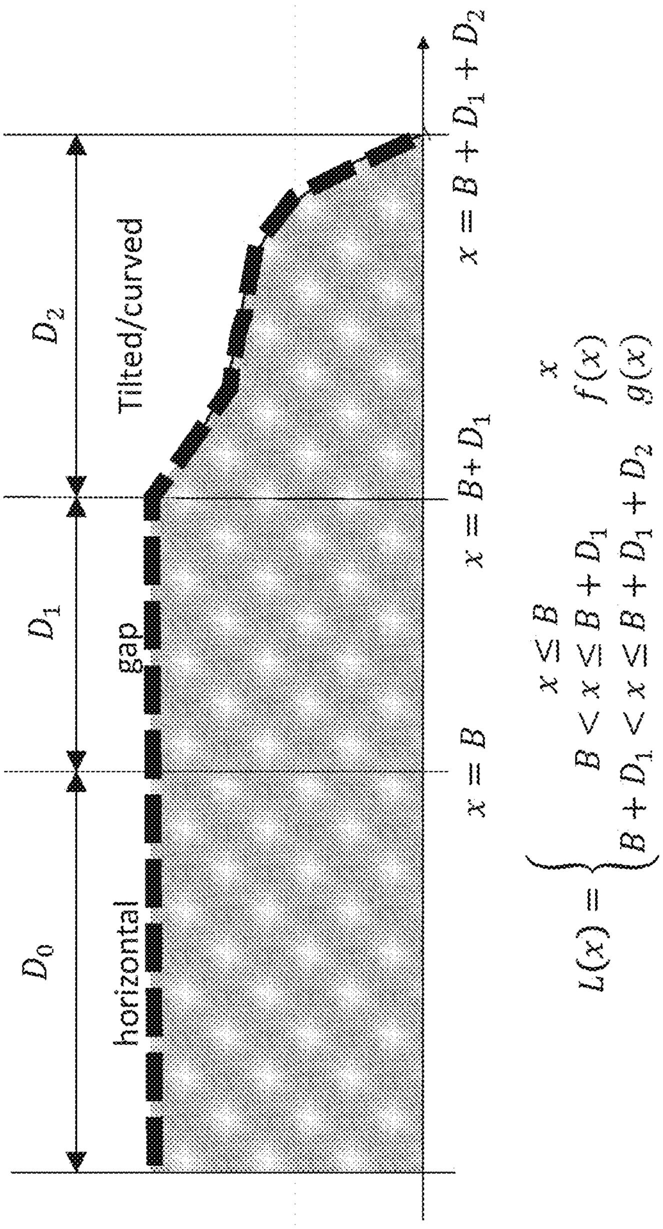
FIG. 10*a* illustrates a derivation of a balanced distortion design based on a distortion function (derived from the tilt and curvature shape) and an optional gap area provided between the side and main surface areas (which may be a portion of the main surface/s which is adjacent to the side surface/s). f and g are both typically linear distortion functions.
Figure 10B:
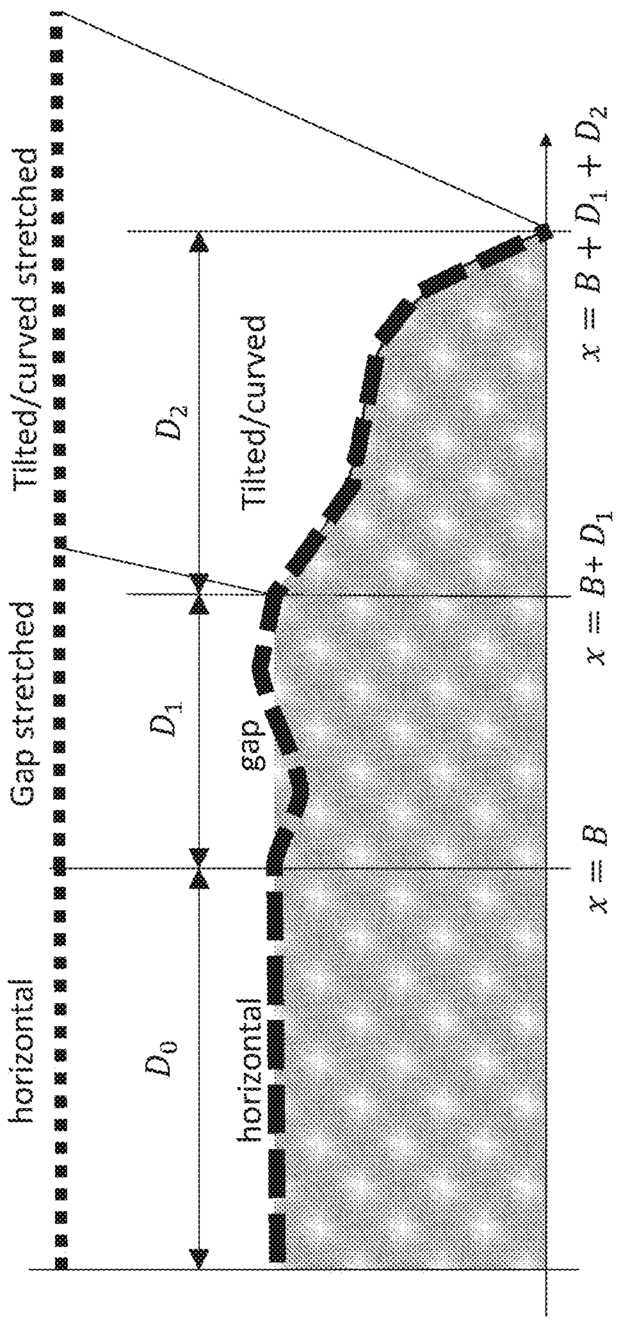

In FIGS. 10*a* and 10*b*, the distortion analysis phase may be supplemented or completed by introducing an optional "printing gap" for additional optional adjustments. The printing gap typically comprises an area near the edge (near the side surface) which is part of the main surface area and some distortion is applied thereto e.g. due to aesthetics and/or due to printer resolution limitations. This distortion may be applied by introducing changes to the printing pattern which may be prior to the change which may occur over the tilted area. Alternatively or in addition, corrective factors can be applied in the printing gap or using the gap area, as the printer head distance from the surface changes as it hovers over the tilted area.

If no distortion is introduced in the gap area, then $f(x)=x$, meaning that the printing pattern is unchanged. However, the edge presents an abrupt change which may introduce some visible effects. This is typically noticeable in the rate of change in $L(x)$. While prior to the gap, $L'(x)=1$, as the edge is passed, $L'(x)$ may change abruptly to a different value. This is a reason why a gap may be used to smooth the changes, hence $f(x)$ may be chosen accordingly e.g. $f(x)$ may be any function with smooth transitions and continuity.

In FIG. 10*b*, some distortion is applied within the gap area. As shown, the gap and tilted areas contribute some length distortion when compared to the actual horizontal displacement (width). Due to the gap and tilted areas printing adjustments, may be provided e.g. as previously demonstrated by the inverse of the length functions.

Printing on the edge may involve calibration which is typically factored into the distortion length function. The calibration process may include printing out parallel lines over a test surface with tilted regions at different angles as demonstrated in FIG. 11*a*. This calibration may for example be carried out once per batch of substrates all having a given edge geometry (a given geometry of the side surface). The actual distances over the tilt are typically measured and tested against lengths as computed. For example, e.g. as previously described regarding the embodiment of FIG. 8, the expected scaling factor for a tilted a slope is $\sqrt{a^2+1}$ but due to the intrinsic characteristics of the printer, the scaling factor may be different, and this may be factored into $g(x)$ e.g. as presented in FIG. 11*a* by the derivatives of chained functions.

Figure 11A:
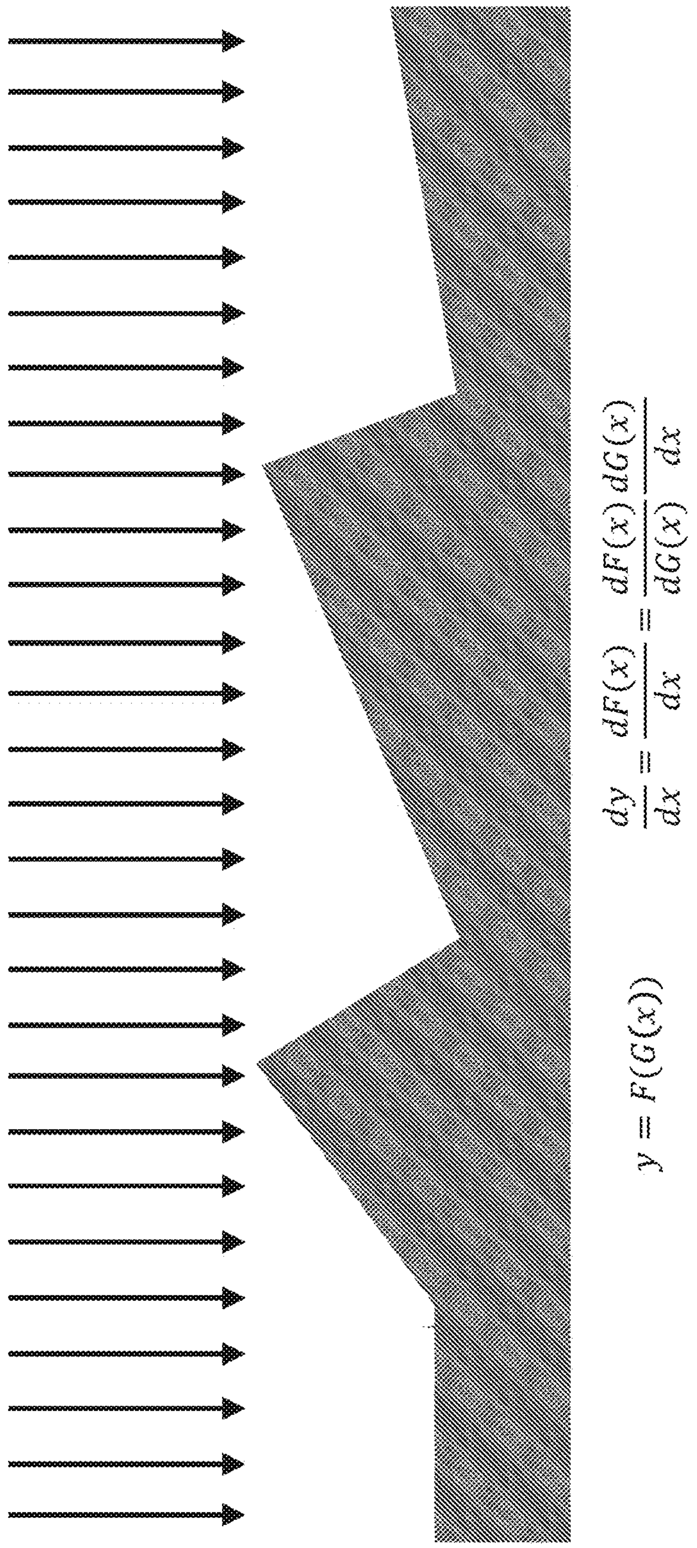
Figure 11B:
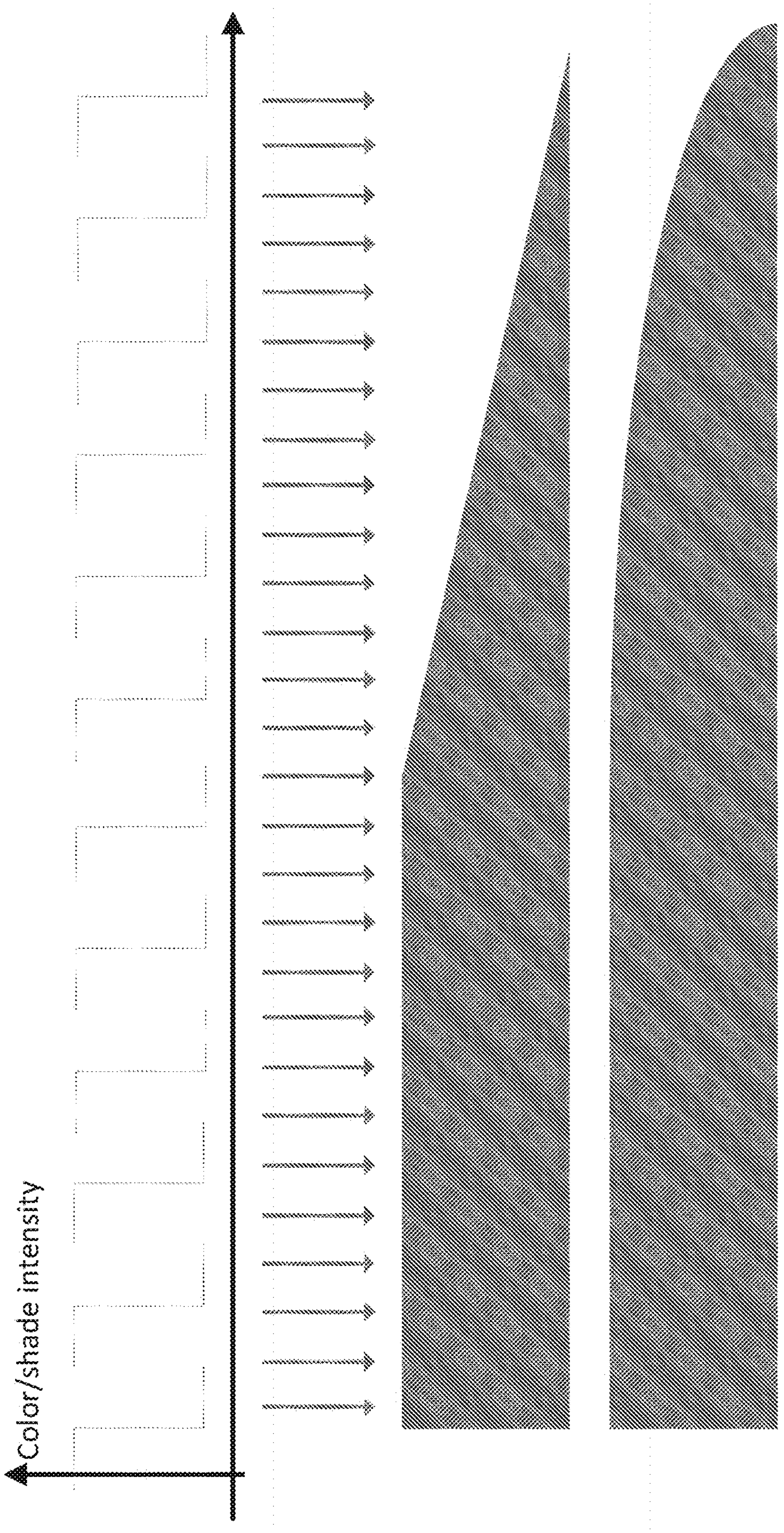

In another embodiment, calibration uses the actual surface (rather than a dedicated test surface as in the embodiment of FIG. 11*a*) e.g. as seen in FIG. 11*b*. In this case a test pattern may be used instead to be printed on a surface whose geometrical properties (e.g. of the side surface) are the same as or similar to surfaces which may be eventually manufactured and printed on. The test pattern may be designed for distance and length measurements. FIG. 11*b* presents one example (yet other examples are valid as well) in which at least one of the color components of the printed row varies between low intensity and high intensity at some known pace (e.g., say, some unit of measurement of intensity, every 10 pixels). The actual printout then reveals the actual distances between the low and high intensity regions and can be measured in length for proper calibration.

Figure 12A:
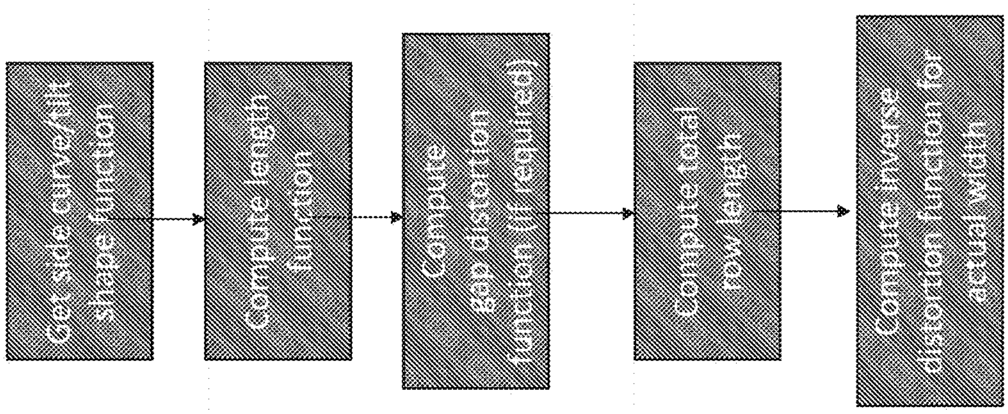
FIGS. 12*a*-12*b* are simplified flowchart illustrations, all or any subsets of whose operations may be provided, in any suitable order e.g. as shown. Specifically.
Figure 12B:
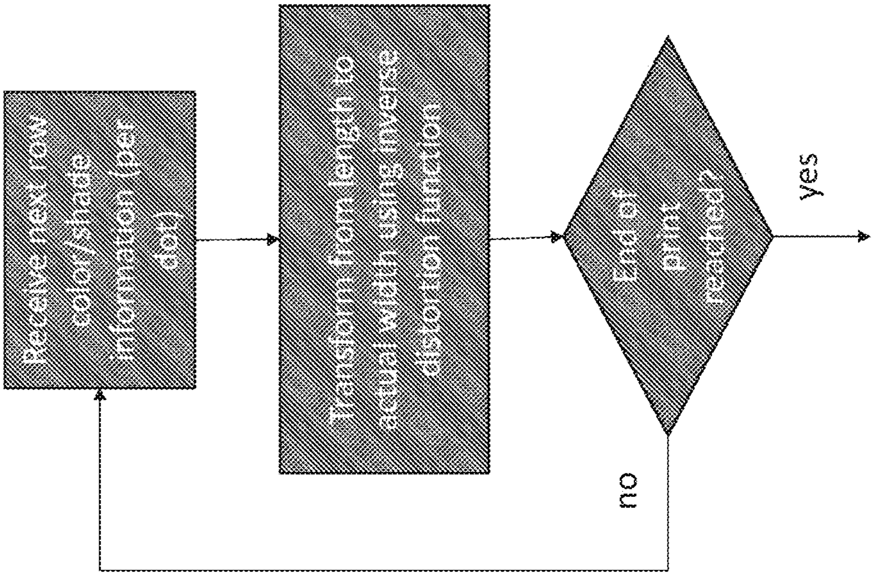

FIGS. 12*a* and 12*b* illustrate a method for computation of distortion adjustments (pre-computed variables e.g. as described below, and a method for applying the distortion adjustments per row of pixels, respectively.

In FIG. 12*a* the system may compute, for each surface geometry, variables used for distortion adjustment. These variables may be computed only once (for each geometry) as they do not change over the printing procedure or patterns.

The method of FIG. 12*a* provides the geometry e.g. tilt (or curvature of) the cross section function which is typically included in the files provided to the machine which manufactures the substrate to be printed. The method then computes the length function of the side surface e.g. the length of the curve of the side surface; it is appreciated that if the side surface is straight, the length is the distance between the intersection point of a cross section of the side surface with the substrate's main top surface, on the one hand, and the intersection point of the cross section of the side surface with the substrate's main bottom surface, on the one hand. However, this is not the case if the side surface is curved. This function may then be used, e.g. as described in FIGS. 6-9*a*, for determining the gap length distortion function e.g. if a gap area is required. FIGS. 6-9*a* illustrate examples of distortion function derivations.

The tilt function and gap length distortion function may both then be used for determining their inverse function equivalents which are then used to translate from length to actual horizontal displacements.

In FIG. 12*b*, for each pattern row the method may receive the color or shade intensity for the full row assumed to be printed on the full length of the substrate's main surface, e.g. from one side-surface to the other. The inverse distortion function e.g. as computed by the method of FIG. 12*a* may then be used to distort, typically for each pattern row, the color or shade intensity information to map into the width of the surface. The process may be repeated for all rows of the pattern (and may be repeated to ensure complete surface coverage.

The total row length typically comprises the actual length side-to-side if the surface is flattened; FIG. 10*b* for example shows shows a surface which is spread or stretched (aka modified).

A small picture or pattern may be repeated again and again to cover an area, e.g. as described below.

Some computations described above are computed once per wall (or wall layer) profile shape e.g. as the length function, since these computations are invariant as long as the profile does not change. Other computations vary depending on the picture file and/or on the functions to convert to printing format and therefore may be performed anew for each picture file and/or for each function used to convert the picture file to printing format.

It is appreciated that "calculate function" in FIGS. 12*a*-12*b* may, according to certain embodiments, include a step-by-step evaluation e.g. as described below.

Figure 13:
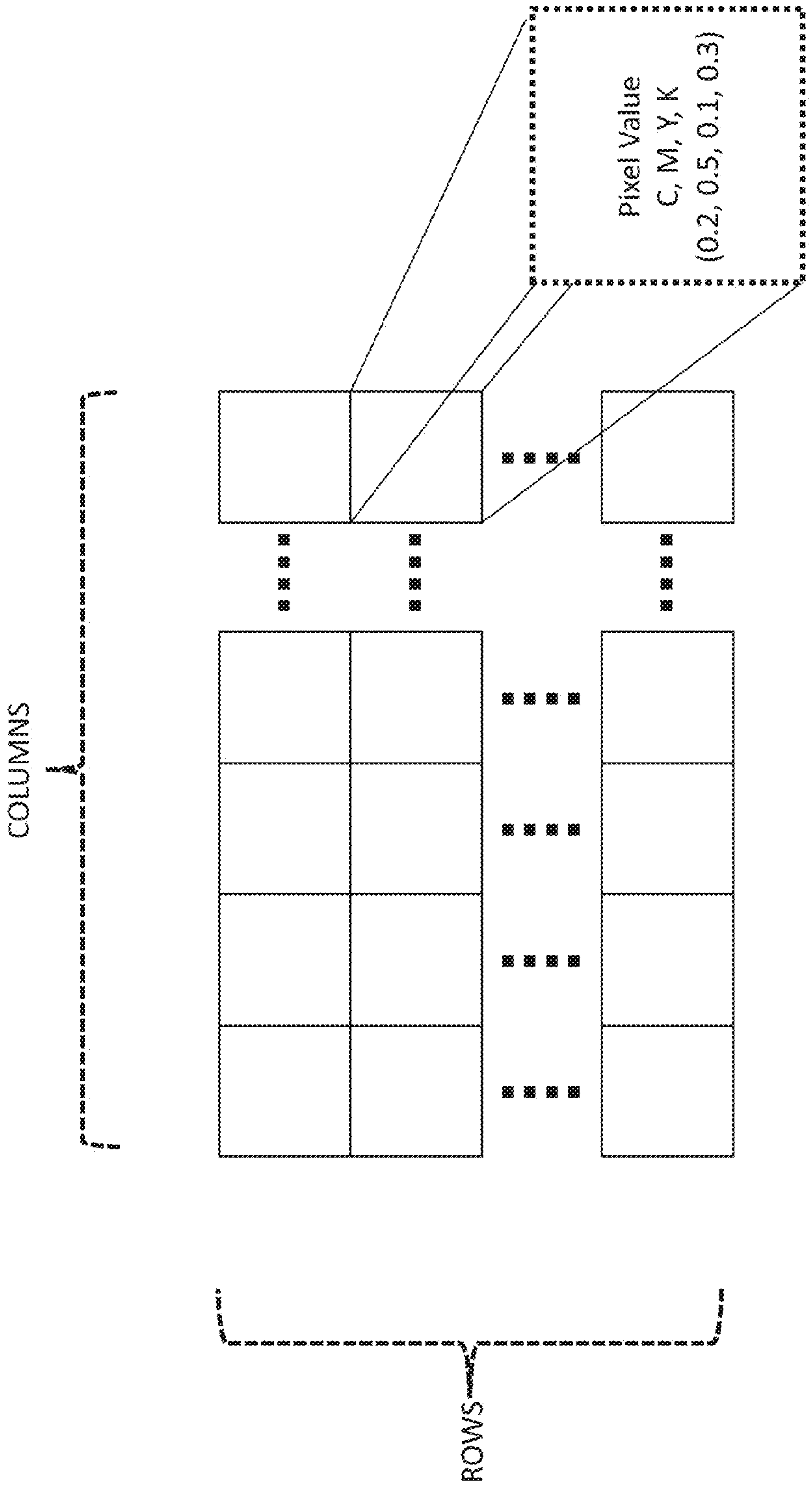

Considerations for converting a picture file to printing instructions or to a modified grid suitable for printing are now described. Consider first the simpler case of printing a picture on a flat leveled surface. A picture file typically comprises pixels arranged in a matrix having rows and columns representing a grid like structure e.g. as shown in FIG. 13. Typically, each picture pixel has a value which represents a specific color mixture. For example, using a CMYK (Cyan, Magenta, Yellow, Black) coordinate system typically used for color printing, the pixel value is determined by a 4 dimensional variable [c,m,k,y] with each component valued between 0 to 1 (0 representing no color, 1 representing maximum color intensity). In another example, the color mixture may be limited to only a single color as with the case of using grayscale (e.g., again 0 to 1, 1 representing black) or even a binary color system which picks one of two colors for a specific pixel (e.g., black or white).

The picture file itself may be compressed to reduce its size, yet after decompression for either viewing or printing purposes, the pixelation structure is recovered. In other cases, the picture file may represent a fixed 2D or 1D pattern to be repeated in use at a certain scale, meaning that the picture file is used plural times to generate a larger picture by repeated use of the picture pattern. For printing purposes, the pattern may be applied repetitively or the overall repetitions by themselves may be regarded as a complete picture file and applied as a whole.

A flat leveled surface, targeted for top printing, can be viewed in a similar way, as a matrix of pixels, as eventually the printer itself (by printing the picture on the surface) has limited resolution. In many cases the printer itself prints a row of pixels by a row of pixels, advancing to the next row after the current row has been printed, with each row including a fixed number of printing spots (hence pixels). Turning now to a discussion of the printed row arrangement i.e. for a certain row: as N printed pixels (per row) represent M picture pixels (per row), the ratio f=M/N may be used to determine a conversion factor (e.g., for scaling) between the printer domain and the picture domain. This means that when 1 pixel is advanced by the printer, f pixels (or some fractions of a pixel) are advanced on the picture row. After the location (e.g. specific picture pixel) has been found, the color mixture value of the printed pixel can be set according to the corresponding picture pixel value. In some cases the value setting can consider not only the corresponding picture pixel, but the surrounding picture pixels as well for visualization purposes (e.g., smoothing, interpolation etc.).

For example, a 100 dpi (dots per inch) printer on a 60 inch opening length (side to side) handles 6000 printed pixels per row. If the picture to be printed in this example has 1000 pixels per row, then the conversion factor is $f=1000/6000=1/6$ which means that every printed pixel represents a small fraction of an original picture pixel (as in this case, $f<1$). For example, printed pixel number 126 may point out to picture pixel number 126/6=21 hence the exact color mixture of the printed pixel can be set to color mixture of the picture pixel. In another case, several printed pixels ahead, printer pixel number 129, points out to picture pixel 129/6=21.5. The printed pixel value may thus be set to some average value between the color value of picture pixel 21 and picture pixel 22 as the printed pixel value is in between picture pixels, and it may be better visually to do so. In the case of printed pixel 130 which points out to picture pixel 130/6=$21\frac{2}{3}$, the color mixture value may be set to $\frac{2}{3}$ of picture pixel 22 and $\frac{1}{3}$ of the picture pixel 21. Other smoothing (e.g., interpolation or extrapolation) techniques may be used, for example using digital filtering (e.g., a windowed moving average applied on several pixels for establishing the value of the current pixel, such as a Hamming window.

In the case when $f>1$ (hence the picture resolution is better than the printed one) a suitable value setting procedure may, similarly, take place. For example, if, in the previous case the printer resolution is 30 dpi (hence 60×30=1800 pixels) and the picture resolution is 3600 pixels, then f=3600/1800=2. This means that printed pixel 126 is actually picture pixel 252. The next printed pixel, 127, corresponds to picture pixel 254 skipping on the value of picture pixel 253 which may be lost or ignored (as it is between the adjacent pictured pixels). A smoothing technique can be applied to take into account skipped pixels. For example, instead of setting printed pixel 126 to picture pixel 252, the system may use a weighted average between picture pixel 252 and 253 or any other weighting scheme, e.g. as described above.

The above description assumes for simplicity that the vertical resolution of the printer matches the vertical resolution of the picture. If this is not the case, an equivalent smoothing computation technique can be applied using a vertical conversion factor with some interpolation (or extrapolation) computations taking into account adjacent vertical pixels (from rows before and rows after). In other cases, a combined smoothing technique using both vertical and horizontal nearby pixels can be used (e.g., 2D digital filter). The end result typically comprises a modified picture pixel row which takes into account the vertical resolution differences between the picture file source and the printer.

Figure 14:
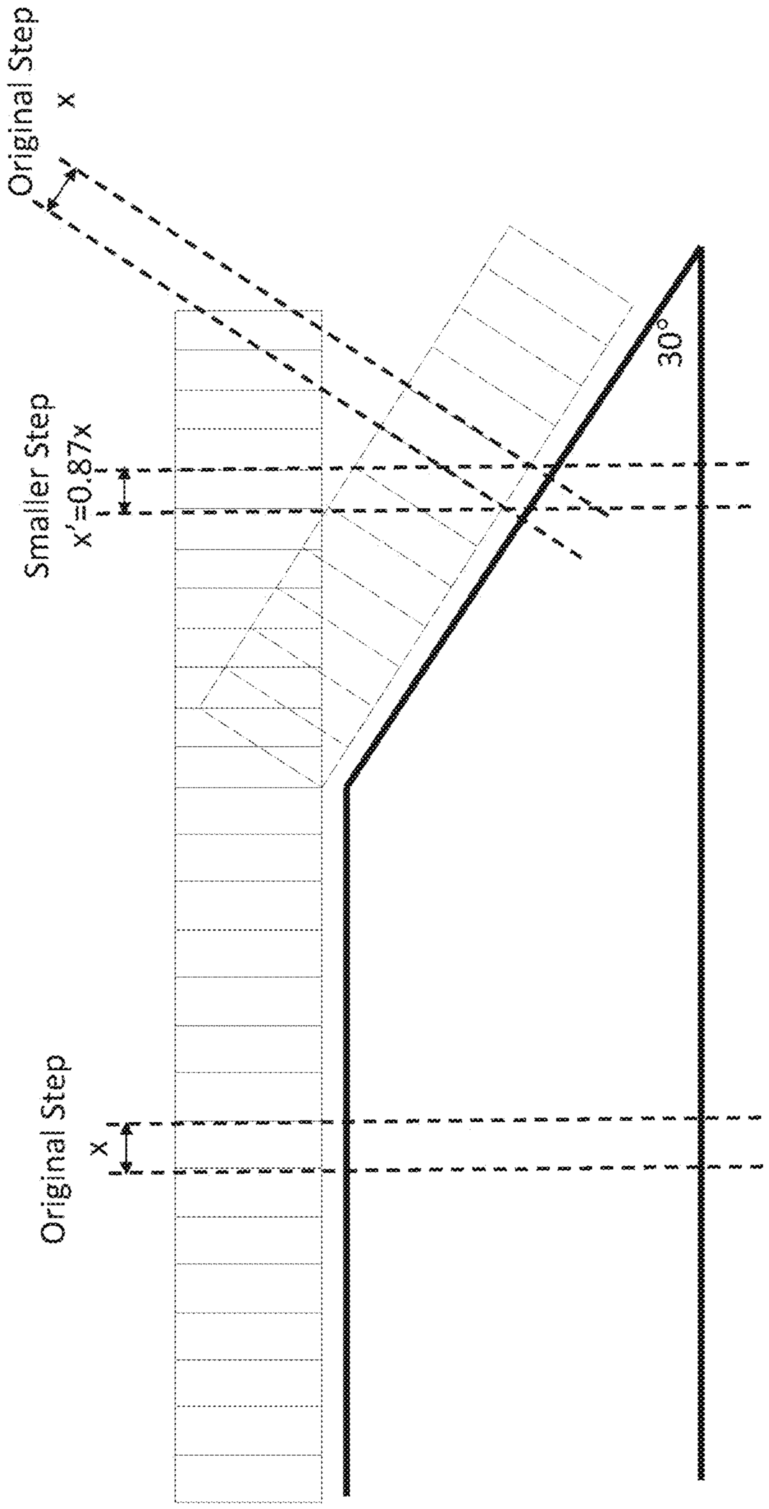

If the surface is not flat and is, instead, either tilted, slanted or curved to some degree, then the projected printing image on the surface may be distorted; the distortion stems from the conversion from a picture pixel domain to the printed pixel domain, which assumes that the printed surface is flat, leveled, and that all printed pixels are identical in size (due to the printing hardware functionality e.g., printing in parallel to the surface assuming a fixed distance between the printer heads and the surface). For example, as shown in FIG. 14, if each printed row contains a pattern of black dots every x millimeters, then if the surface contains tilted regions at 30 degrees, then the distance between the black dots may increase to x/cos(30°)≈1.16×. If the pattern is desired to be fixed on top of the surface as with the case of a flat and leveled surface, then the black printed pixels may be set at the printer with a smaller distance of x·cos(30°) ≈0.87× between dots hence effectively shrinking the image in advance and acknowledging that by doing so, the tilted surface may effectively magnify the image due to projection of the image on a tilt.

The printer pixel dimension is typically fixed and cannot be adjusted pixel by pixel. If this is the case, then what can be changed is the way picture pixels are converted or mapped to printed pixels. While advancing between adjacent printed pixels, the system advances at a certain distance between picture pixels and when the surface becomes tilted, the system advances more quickly between picture pixels (reducing the distance).

Typically, the conversion factor between picture pixels and printed pixels is increased by a factor as a function of the surface curvature characteristic. In FIG. 6, the length of a curved surface is represented by some curved function y=f(x) (where x is the displacement). If advancing horizontally by some small step Δx, then the advancement over the curve, ΔL, may be related to the derivative of the curved function, hence $\Delta L \approx \Delta x\sqrt{1+[f'(x)]^2}$. In the case of a flat leveled surface $f'(x)=0$, and ΔL=Δx but in any other case, the advancement over the curve is typically greater than the horizontal step Δx. This confirms that if ΔL remains constant (for preventing distortion while printing over the curve, hence fixing the step size or pixel size over the curve) then Δx may be adjusted to a lesser or equal value than ΔL. However, as the printer pixel dimension cannot change, this means that Δx is fixed and ΔL may be increased according to the curvature of the surface.

A process ("process P") described for converting a picture file to printing instructions or to a modified grid suitable for printing, typically includes all or any subset of the following operations, suitably ordered e.g. as follows:

1) Retrieve or compute scaling factor f and physical displacement step Δx
2) Initialize picture row pixel index p=0.
3) Initialize printer row pixel index r=0.
4) Initialize horizontal displacement variable x=0 and length variable L=0
5) Advance to next printer pixel r=r+1, x=x+Δx
6) Exit row process if end of row reached
7) Compute f'(x) and approximate $\Delta L \approx \Delta x\sqrt{1+[f'(x)]^2}$
8) Advance to next picture pixel p=p+f·ΔL/Δx
9) Is the last picture pixel reached? If yes, go to operation 14
10) Retrieve pixel p value (and surround pixels if a smoothing or interpolation process is applied)
11) Assign p value to r, r=p (or compute a smoothed/interpolated value based on current pixel and surrounding pixels, and assign to r)
12) Print pixel (or store in file for later printing)
13) Go to operation 5
14) If the picture is a repeated pattern to be printed, then reset index p, and go to operation 5
15) Exit row process (no more pixels to print)

The physical displacement variable represents real world physical dimensions. The above process may be adjusted if a gap function is used e.g. as previously described if desired for visualization improvements (see e.g. the embodiments of FIGS. 10*a*-10*b*).

Adding a gap function can be done using a curvature function which incorporates different functions depending on the value of x. For example, consider the following curvature function with no gap, which is leveled flat for x<2 and becomes tilted at the edge (x between x=2 to x=4).

$$f(x) = \begin{cases} 1 & x < 2 \\ 1 - 0.2(x-2) & 2 \le x < 4 \end{cases}$$

When adding a gap function, continuity is typically a consideration. For example, the previous function may be modified to include a gap zone between x=1 to x=2 (meaning that the picture may be distorted before reaching the physical edge at x=2). At x=1 and x=2 the function values remain the same as before.

$$g(x) = \begin{cases} 1 & x < 1 \\ 1.25 - (x-1.5)^2 & 1 \le x < 2 \\ 1 - 0.2(x-2) & 2 \le x < 4 \end{cases}$$

In other cases, choices for the gap function may preserve the continuity of f'(x) as well, due to the fact that this a gap function may result in an abrupt change while stepping through the picture row pixels (see operation 7 in process P).

Typically, the printing pixels are fixed in size and the modified printer grid becomes neither smaller nor bigger than the original picture file. Typically, neither the inherent printer resolution, nor the original picture resolution, change during processes described herein.

Any suitable mapping, from the original picture file to the modified printer grid, may be employed.

If a curved surface is flattened to a leveled one, the surface is typically not stretched. For example, one may assume that the substrate on which the system is printing, includes a leveled part (100 cm) and then a tilted equal size part 60 degrees (another 100 cm, but tilted). The printer "sees" 100+100 cos(60)=150 cm before the surface is flattened and sees 100+100=200 cm if the surface is flattened. FIG. 14 illustrates a possible outcome if a system prints black/white dots in a certain pattern, ignoring the surface, which clarifies the advantage of mapping picture pixels to printed pixels differently (the mapping is not the unity function) when printing a tilted area, as opposed to printing on a substrate which is completely flat or planar.

For example, in one mapping used for a tilted surface, the system may skip alternating picture pixels, meaning that the next printed pixel is not the next picture pixel, but the one after. This shrinks the picture (as half of the picture pixels are eliminated) and the system proceeds faster in the file and the tilted surface may re-magnify or re-stretch the picture while absorbing the printed pixels from above.

It is appreciated that only certain methods are described herein, for computing a picture file or grid of pixels for the printer, given an input grid which stores a desired picture suitable for printing on a flat surface.

Any suitable printer may be employed; a commercially available example is the HP Latex r2000 plus printer. One example of a wall layer which may be the substrate on which the system is printing, is a high performance acrylic layer e.g. CORIAN, which may be a few mm think and may be the outward-facing or visible layer from among several wall layers which, together, are used to construct a wall.

Other substrates which may be printed on include rigid substrates such as but not limited to paper foamboard, plastic foamboard, PVC foam, plastic corrugated, acrylic, polycarbonate, polystyrene, compressed cardboard, corrugated board, honeycomb board, aluminum composite panel, wood, glass, ceramic and roll substrates such as but not limited to PVC banner, self-adhesive vinyl, coated paper, polypropylene, polystyrene, polycarbonate, polyester, textile (non porous), The scope of the invention includes, inter alia, 3d printing. For example, according to certain embodiments, a substrate may be printed in any suitable color since only at least one surface of the substrate is going to be visible in the contemplated use-case. Then, a coating of a desired color is applied to that surface by the 3D printer. In this case, the teachings of the present invention may apply. Embodiments herein are particularly applicable when there is a limit or constraint of the printer head to get close to the surface on which a given picture or grid is to be printed. In this case, embodiments herein can compensate at least partially for this limit or constraint, by modifying regions of the picture e.g. as described herein.

It is appreciated that terminology such as "mandatory", "required", "need", and "must", refer to implementation choices made within the context of a particular implementation or application described herewithin for clarity, and are not intended to be limiting, since, in an alternative implementation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device, or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations, as appropriate. Included in the scope of the present disclosure, inter alia, are machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform, e.g. in software, any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory, or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

The system may, if desired, be implemented as a network—e.g. web-based system employing software, computers, routers and telecommunications equipment, as appropriate.

Any suitable deployment may be employed to provide functionalities e.g. software functionalities shown and described herein. For example, a server may store certain applications, for download to clients, which are executed at the client side, the server side serving only as a storehouse. Any or all functionalities e.g. software functionalities shown and described herein may be deployed in a cloud environment. Clients e.g. mobile communication devices, such as smartphones, may be operatively associated with, but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false. and to perform y each time x is determined to be true, thereby to yield a processor which performs y at least once, typically on an "if and only if" basis e.g. triggered only by determinations that x is true, and never by determinations that x is false.

Any determination of a state or condition described herein, and/or other data generated herein, may be harnessed for any suitable technical effect. For example, the determination may be transmitted or fed to any suitable hardware, firmware or software module, which is known or which is described herein to have capabilities to perform a technical operation responsive to the state or condition. The technical operation may, for example, comprise changing the state or condition, or may more generally cause any outcome which is technically advantageous given the state or condition or data, and/or may prevent at least one outcome which is disadvantageous, given the state or condition or data. Alternatively or in addition, an alert may be provided to an appropriate human operator or to an appropriate external system.

Features of the present invention, including operations, which are described in the context of separate embodiments, may also be provided in combination in a single embodiment. For example, a system embodiment is intended to include a corresponding process embodiment, and vice versa. Also, each system embodiment is intended to include a server-centered "view" or client centered "view", or "view" from any other node of the system, of the entire functionality of the system, computer-readable medium, or apparatus, including only those functionalities performed at that server or client or node. Features may also be combined with features known in the art and particularly, although not limited to, those described in the Background section, or in publications mentioned therein.

Conversely, features of the invention, including operations, which are described for brevity in the context of a single embodiment or in a certain order, may be provided separately or in any suitable subcombination, including with features known in the art (particularly although not limited to those described in the Background section, or in publications mentioned therein) or in a different order. "e.g." is used herein in the sense of a specific example which is not intended to be limiting. Each method may comprise all or any subset of the operations illustrated or described, suitably ordered e.g. as illustrated or described herein.

Devices, apparatus or systems shown coupled in any of the drawings may in fact be integrated into a single platform in certain embodiments, or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation, and is not intended to be limiting.

Any suitable communication may be employed between separate units herein e.g. wired data communication and/or in short-range radio communication with sensors such as cameras e.g. via WiFi, Bluetooth or Zigbee.

It is appreciated that implementation via a cellular app as described herein is but an example, and, instead, embodiments of the present invention may be implemented, say, as a smartphone SDK; as a hardware component, as an STK application, or as suitable combinations of any of the above.

Any processing functionality illustrated (or described herein) may be executed by any device having a processor, such as but not limited to a mobile telephone, set-top-box, TV, remote desktop computer, game console, tablet, mobile e.g. laptop or other computer terminal, embedded remote unit, which may either be networked itself (may itself be a node in a conventional communication network e.g.) or may be conventionally tethered to a networked device (to a device which is a node in a conventional communication network, or is tethered directly or indirectly/ultimately to such a node).

Any operation or characteristic described herein may be performed by another actor outside the scope of the patent application, and the description is intended to include apparatus whether hardware, firmware or software, which is configured to perform, enable or facilitate that operation or to enable, facilitate or provide that characteristic.

The terms processor or controller or module or logic as used herein are intended to include hardware such as computer microprocessors or hardware processors, which typically have digital memory and processing capacity, such as those available from, say, Intel and Advanced Micro Devices (AMD). Any operation or functionality or computation or logic described herein may be implemented entirely or in any part on any suitable circuitry including any such computer microprocessor/s, as well as in firmware or in hardware, or any combination thereof.

It is appreciated that elements illustrated in more than one drawing, and/or elements in the written description, may still be combined into a single embodiment, except if otherwise specifically clarified herewithin. Any of the systems shown and described herein may be used to implement or may be combined with, any of the operations or methods shown and described herein.

It is appreciated that any features, properties, logic, modules, blocks, operations or functionalities described herein which are, for clarity, described in the context of separate embodiments, may also be provided in combination in a single embodiment, except where the specification or general knowledge specifically indicates that certain teachings are mutually contradictory, and cannot be combined. Any of the systems shown and described herein may be used to implement, or may be combined with, any of the operations or methods shown and described herein.

Conversely, any modules, blocks, operations or functionalities described herein, which are, for brevity, described in the context of a single embodiment, may also be provided separately or in any suitable sub-combination, including with features known in the art. Each element e.g. operation described herein, may have all characteristics and attributes described or illustrated herein, or, according to other embodiments, may have any subset of the characteristics or attributes described herein.

The invention claimed is:

1. A system for manufacturing structural members with coated topmost and side surfaces, the system comprising:

at least one structural member having a topmost surface, a bottommost surface, and at least one side surface which is obliquely oriented relative to the topmost surface and the bottommost surface;

a coating apparatus operative to deposit at least one coating on said at least one structural member including the topmost surface and said at least one side surface, wherein the coating comprises a pattern including at least one first portion of the pattern to be printed on at least a portion of the topmost surface and at least one second portion of the pattern to be printed on said at least one side surface, and wherein the at least one side extends between the at least one structural member's topmost and bottommost surfaces, and wherein the at least one side surface forms a curve having a length which differs from a width of the at least one structural member, wherein the length equals a distance between the at least one structural member's topmost and bottommost surfaces, and a hardware processor configured to modify the second portion of the pattern computationally, thereby to define a modified second portion of the pattern, wherein the modified second portion of the pattern is applied to the at least one side surface, and wherein the hardware processor modifies the second portion of the pattern by obtaining a geometry of the at least one side surface, using the geometry to calculate at least one distortion function, and using the at least one distortion function to modify color or shade intensity of the second portion of the pattern.

2. The system of claim 1 wherein the coating apparatus comprises an array of printing heads and wherein the coating is printed onto the at least one structural member.

3. The system of claim 1 wherein the at least one structural member is apertured thereby to define aperture side surfaces and wherein the at least one side surface which is obliquely oriented relative to the topmost surface and the bottommost surface includes at least one of the aperture side surfaces.

4. The system of claim 1 wherein the at least one side surface which is obliquely oriented is a straight surface whose angle relative to the topmost surface and the bottommost surface differs from 90 degrees.

5. The system of claim 1 wherein the at least one structural member is rigid and wherein at least one of the topmost surface and the bottommost surface is planar.

6. The system of claim 1 wherein the coating comprises a layer of ink.

7. The system of claim 1, wherein the hardware processor is configured to modify a third portion of the pattern to be printed on a transition region comprising at least a portion of the topmost surface and at least a portion of the at least one side surface, and wherein the modified third portion of the pattern is applied between the first portion of the pattern and the modified second portion of the pattern.

8. A method for manufacturing structural members with coated topmost and side surfaces, the method comprising:

providing at least one structural member having a topmost surface, a bottommost surface, and at least one side surface which is obliquely oriented relative to the topmost surface and the bottommost surface;

depositing, using a coating apparatus, at least one coating on said at least one structural member including on the topmost surface and said at least one side surface, wherein the coating comprises a pattern including at least one first portion of the pattern to be printed on at least a portion of the topmost surface and at least one second portion of the pattern to be printed on the at least one side surface, wherein the at least one side surface extends between the at least one structural member's topmost and bottommost surfaces, and wherein the at least one side surface forms a curve having a length which differs from a width of the at least one structural member, wherein the length equals a distance between the at least one structural member's topmost and bottommost surfaces, and wherein the second portion of the pattern is modified computationally, by a hardware processor, thereby to define a modified second portion of the pattern, wherein the modified second portion of the pattern is applied to the at least one side surface, and wherein the hardware processor modifies the second portion of the pattern by obtaining a geometry of the at least one side surface, using the geometry to calculate at least one distortion function, and using the at least one distortion function to modify color or shade intensity of the second portion of the pattern.

9. The method of claim 8 wherein the coating comprises a pattern including at least one first portion of the pattern to be printed on at least a portion of the topmost surface and at least one second portion of the pattern to be printed on the at least one side surface.

10. The method of claim 8 wherein the coating comprises a layer of ink.

11. The method of claim 8 wherein the coating apparatus comprises an array of printing heads and wherein the coating is printed onto the at least one structural member.

12. The method of claim 8 wherein the at least one side surface's oblique orientation relative to at least one of the topmost surface or the bottom more surface defines-an angle, between at least one of the topmost surface or the bottommost surface and the at least one side surface, of over 90 degrees, and wherein said depositing of said at least one coating using said coating apparatus includes depositing the coating on the topmost surface and on the at least one side surface.

13. The method of claim 12 wherein the second portion of the pattern is printed on a surface including said at least one side surface and a portion of the topmost surface adjacent to the at least one side surface, and wherein the first portion of the pattern is printed on a portion of the topmost surface that does not include the portion of the topmost surface adjacent to the at least one side surface on which the second portion is printed.

14. A computer program product, comprising a non-transitory tangible computer readable medium having computer readable program code embodied therein, that, when executed by a hardware processor of a system for manufacturing structural members including a coating apparatus operative to deposit at least one coating on at least one structural member having a topmost surface, a bottommost surface, and at least one side surface which is obliquely oriented relative to the topmost surface and the bottommost surface, the coating apparatus operative to deposit the at least one coating on the topmost surface and said at least one side surface, executes the method comprising:

computational modification of a second portion of a pattern, to be included in the coating, the pattern including at least one first portion of the pattern to be printed on at least a portion of the topmost surface and at least one second portion of the pattern to be printed on the at least one side surface, to define a modified second portion of the pattern to be applied to the at least one side surface, wherein the at least one side surface extends between the at least one structural member's topmost and bottommost surfaces, wherein the at least one side surface forms a curve having a length which differs from a width of the at least one structural member, wherein the length equals a distance between the at least one structural member's topmost and bottommost surfaces, and wherein the hardware processor modifies the second portion of the pattern by obtaining a geometry of the at least one side surface, using the geometry to calculate at least one distortion function, and using the at least one distortion function to modify color or shade intensity of the second portion of the pattern.

15. The computer program product of claim 14 wherein the coating apparatus comprises an array of printing heads and wherein the coating is printed onto the at least one structural member.

* * * * *